2 Sheets--Sheet 1.

G. T. & A. SMITH.

Flour-Bolts.

No. 6,197. Reissued Dec. 29, 1874.

Witnesses
Henry Orth
Jno. J. Chandler Jr.

Inventors.
George T. Smith
Aaron Smith
by H. H. Doubleday atty

N. PETERS. Photo-Lithographer, Washington, D. C.

2 Sheets--Sheet 2.

G. T. & A. SMITH.

Flour-Bolts.

No. 6,197.

Reissued Dec. 29, 1874.

Witnesses.
Henry Orth
Jno. J. Pattison Jr.

Inventors.
George T. Smith
Aaron Smith
by H. H. Doubleday atty.

N. PETERS. Photo-Lithographer, Washington, D. C.

UNITED STATES PATENT OFFICE.

GEORGE T. SMITH, OF MINNESOTA CITY, AND AARON SMITH, OF HASTINGS, MINNESOTA.

IMPROVEMENT IN FLOUR-BOLTS.

Specification forming part of Letters Patent No. 135,496, dated February 4, 1873; Reissue No. 6,197, dated December 29, 1874; application filed August 18, 1874.

DIVISION A.

*To all whom it may concern:*

Be it known that we, GEORGE T. SMITH, formerly of Washington, District of Columbia, but now of Minnesota City, Minnesota, and AARON SMITH, of Hastings, Minnesota, have invented a Flour-Dressing Machine, of which the following is a specification:

In that class of flour-dressers in which the material is treated upon a reciprocating bolt or shaker, great difficulty has been experienced arising from the clogging of the meshes of the bolting-cloth, and the first part of our invention is designed to remedy this defect. To this end we employ an oscillating bolt, in which the material slides from one side to the other, thus leaving portions of the cloth alternately exposed to the draft of air without being loaded with flour, the result being that particles which in a shaker (where the surface is constantly covered) would lodge in the meshes of the cloth, are lifted out by the air current, thus keeping the bolt clear. The second part of the invention consists in dividing the space through which the air-currents are drawn, after they leave the bolt, into sections, and providing each section with an opening to permit the material collected in each section to be examined, in order to determine the character of the stuff which is drawn by the air-currents from different parts of the bolt-cloth. The third part of our invention relates to the construction within the air-chamber, and immediately above the bolting-surface, of a pocket having an inclined side or shelf, combined with a transverse partition or wall, whereby said inclined side or shelf is adapted to conduct the material deposited in such pocket by the air-current to the bottom thereof, so that it may be readily discharged therefrom, and also form one side of a converging air-chamber.

Figure 1:
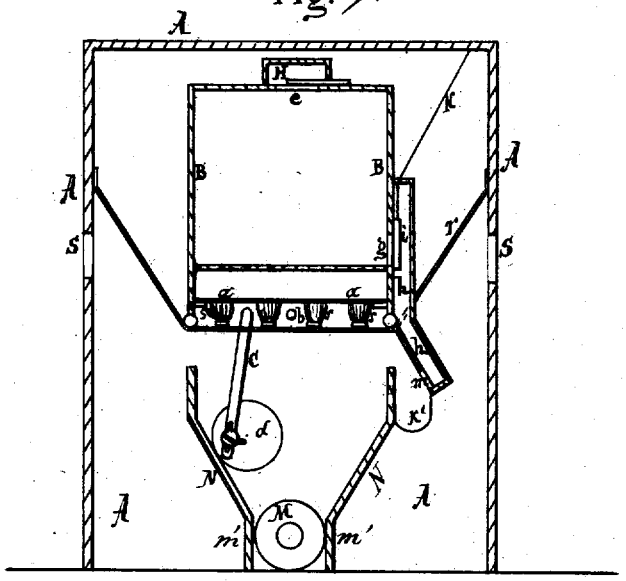
Figure 4:
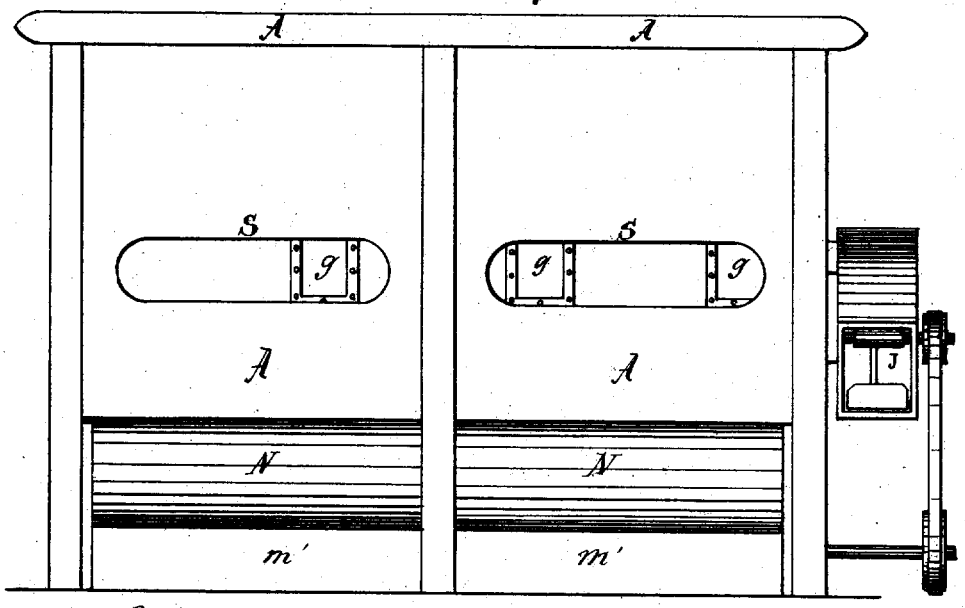
Figures 2, 3:
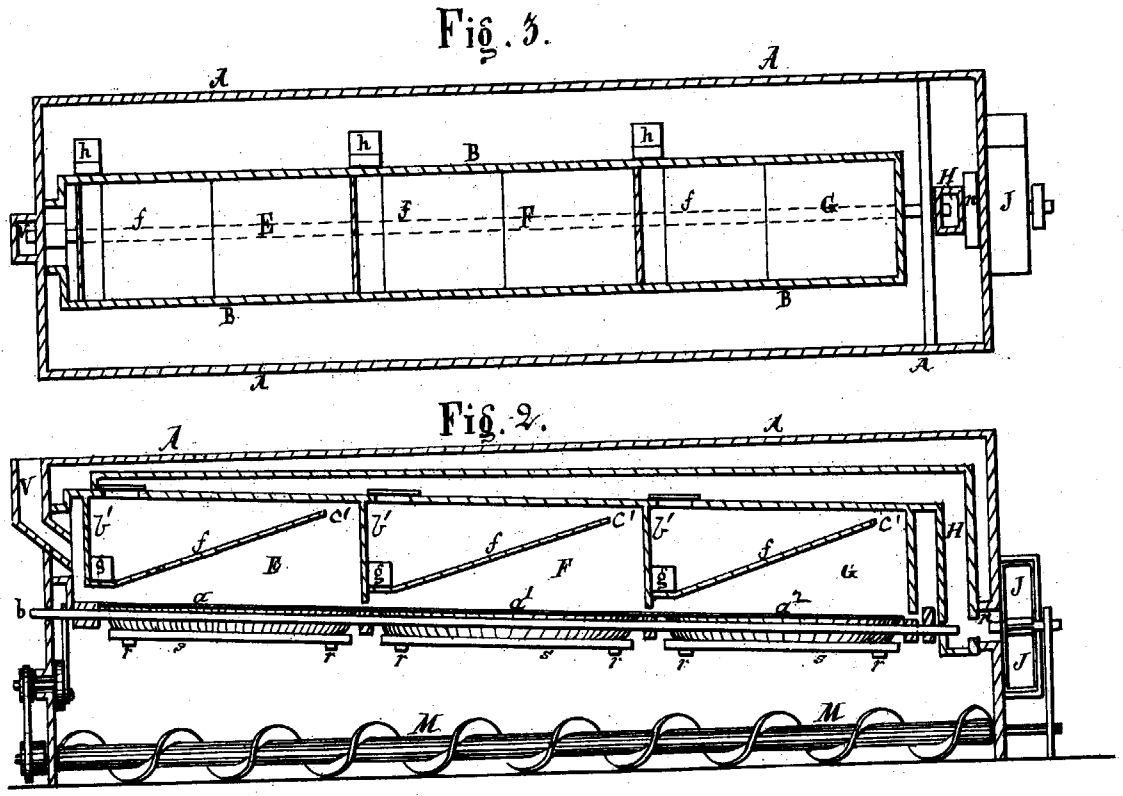

Figure 1 is a vertical transverse section, showing a discharge-spout attached to the bolting-chamber and adapted to receive material through an opening, *g*. Fig. 2 is a longitudinal vertical section. Fig. 3 is a plan view in section, and Fig. 4 is a side view without the discharge-spouts shown in Fig. 1, with a portion of the outer casing removed to show the gather-boards and conveyer.

A represents the frame-work and inclosing-case. Inside this case is a bolting-case, B, closed except, as hereinafter mentioned, at the top, sides, and ends, and with a bolting-cloth, $a$ $a^1$ $a^2$, to cover the bottom. The case B rests upon a shaft, *b*, which has journals at each end, and upon this shaft it is oscillated, using, preferably, for this purpose a pitman, *c*, attached to the wheel *d*. We have shown the bolting-case B as divided into three chambers, E F G, each having an adjustable opening, *e*, at the top into the suction air tube H. This tube is connected to and passes over the top of the bolting-case B, and down its rear end till it meets and opens into a tube, *n*, attached to the case A, and connected with the suction-fan J. In each chamber is a shelf, *f*, arranged in an inclined position. The lower end of each shelf joins a vertical partition, *b'*, the upper end terminating near the top of the bolting-case, and forming a narrow throat, as at *c'*, Fig. 2. The space inclosed between each shelf *f* and partition forms a pocket or deposit-chamber, as will be hereinafter fully explained. There are openings *g* through case B into each of these pockets or chambers. There are also openings S through the outer case A, and through openings S and *g* access may be had to the pockets or chambers formed by the partitions *b'*, the inclined shelves *f*, and the sides of the bolting-case B.

Figs. 1 and 3 show a spout, *h*, arranged upon case B to inclose each opening *g*, and provided with a sliding gate, *i*, which is fitted with a cord, *k*, at the top, and with a spring at the bottom. Another gate, *m*, is fitted with a cord, *k'*, and with a spring. *r r* are belts fastened at the ends to the outer case, and running over pulleys on the lower part of the bolting-case. Attached to these belts are brushes *s s*. V is a hopper for feeding the meal to the bolt. M is the conveyer, and from its shaft we prefer to drive the crank-wheel *d* and pitman *c*. The meal to be bolted is fed in at the hopper V, and thence to the bolt, this end of the bolt being the highest, as in Fig. 2, and when it, the bolt, is oscillated, the material is thrown from side to side, sliding across the cloth and sifting freely through it. As the air is drawn up through the cloth by the fan J, the lighter portion of the bran and specks passes up over the top of the shelves *f* through the throats *c'*, some of it being carried off by the fan, and some being deposited at the bottom of the shelves.

When the spouts *h* are employed, Figs. 1 and 3, it will be readily seen that as the bolt is oscillated toward the side on which the spouts are placed the cord *k* opens the gate *i*, and the contents of the pockets or chamber are thrown into the spout, the reverse motion closing gate *i* and opening gate *m* by means of cord *k'*, thus emptying the contents of the spout into a hopper, which may be arranged near the outer case. The bolt-cloth is cleaned by being drawn across the brushes as the bolt is oscillated. The bolt is covered with different grades or numbers of cloth, and the finest particles are sifted out in chamber E, the next in chamber F, and so on.

We prefer to use three air-chambers, but in some cases one will be all that is required.

The conveyer operates in the same manner and for the same purpose as that in ordinary flour-dressers.

The openings S in the case admit air to the under side of the bolt, and permit an inspection of the work; and it is apparent that by examining the material which is being deposited in the chambers or pockets the operator can ascertain whether or not the air-currents are taking out a proper and desirable quality and proportion from each of the different grades of cloth on the bolt. The convergence between the inclined shelves and the opposing partition insure that the strength and velocity of the air-currents shall be constantly increased after leaving the bolting-surface until they reach the throats *c'*; therefore, when specks once leave the cloth in an upward direction, they are pretty certain not to fall back again.

The flour which falls through the lower end of the bolt is coarser and not so well cleaned as that which passes through the upper end; hence it is not desirable to mix the two, as is sometimes done in an objectionable degree in those machines which have brushes traversing the bolt lengthwise, either from the head to the tail, or vice versa; but in our construction this difficulty is obviated by brushing the bolt crosswise, as it is apparent that in this machine it is impossible for the brushes to carry any flour which falls through one end of the bolt and mix it with that which falls through the opposite end of the cloth; but neither the arrangement of the brushes nor the devices for operating them form any part of the invention which is claimed in this division of the reissue.

We consider an oscillating bolt preferable in some respects to either a reel or a shaker, as in the former the flour is thrown or falls against the cloth, thus forcing more or less of the bran and specks through, and in the latter, as the surface is always loaded, particles are constantly forced into the meshes by the material above them, while in our construction portions of the cloth are alternately exposed to the free action of the air-currents, and are thereby kept more free, although in practice we prefer to employ brushes, as shown.

What we claim is—

1. In a flour-dressing machine in which a current of air is made to pass through the bolting-cloth in one direction, while the material to be operated upon falls in the opposite direction, a bolt, which oscillates in a path transverse to that in which the material flows from the receiving end to the discharging end of said bolt, whereby each side of the bolt is alternately exposed to the action of the air-current without being loaded with flour, substantially as set forth.

2. In a flour-dresser, a series of pockets or chambers arranged above the bolting-surface, in which material taken from the bolting surface by the air-current is collected, and provided with openings to permit an examination of the substance deposited in the pockets or chambers, substantially as set forth.

3. In a machine for dressing flour, a pocket formed within the air-chamber and immediately above the bolting-surface, consisting of an inclined shelf combined with a transverse partition or wall, whereby said inclined shelf is adapted to conduct the material deposited in said pocket by the air-current to the bottom thereof, so that it may be readily discharged therefrom, and also form one side of a converging air-chamber, substantially as set forth.

GEORGE T. SMITH.
AARON SMITH.

Witnesses to GEO. T. SMITH:
W. H. YALE,
CHAS. F. ROWELL.

Witnesses to AARON SMITH:
WALTER W. ADAMS,
THEODORE BACON.